United States Patent
Glenn

(10) Patent No.: US 12,089,684 B2
(45) Date of Patent: Sep. 17, 2024

(54) BICYCLE HELMET WARNING SYSTEM

(71) Applicant: Karen B. Z. Glenn, Palo Alto, CA (US)

(72) Inventor: Karen B. Z. Glenn, Palo Alto, CA (US)

( * ) Notice: Subject to any disclaimer, the term of this patent is extended or adjusted under 35 U.S.C. 154(b) by 609 days.

(21) Appl. No.: 17/196,871

(22) Filed: Mar. 9, 2021

(65) Prior Publication Data

US 2021/0274875 A1    Sep. 9, 2021

Related U.S. Application Data

(60) Provisional application No. 62/987,323, filed on Mar. 9, 2020.

(51) Int. Cl.
  *B62J 3/00*    (2020.01)
  *A42B 3/04*    (2006.01)
  *G01P 15/02*    (2013.01)
  *G01V 11/00*    (2006.01)

(52) U.S. Cl.
  CPC ............ *A42B 3/0466* (2013.01); *G01P 15/02* (2013.01); *G01V 11/00* (2013.01)

(58) Field of Classification Search
  CPC ........ A42B 3/0466; G01P 15/02; G01V 11/00
  USPC ........................................................ 340/432
  See application file for complete search history.

(56) References Cited

U.S. PATENT DOCUMENTS

| | | | |
|---|---|---|---|
| 7,973,652 B1 | 7/2011 | Smith et al. | |
| 10,959,479 B1* | 3/2021 | Babu | B62J 45/41 |
| 2012/0223833 A1 | 9/2012 | Thomas et al. | |
| 2016/0073722 A1* | 3/2016 | Eustace | A42B 3/0466 340/539.13 |
| 2016/0292520 A1* | 10/2016 | Takahashi | G06V 20/59 |
| 2017/0136875 A1* | 5/2017 | Logan | H04W 4/80 |
| 2017/0150333 A1* | 5/2017 | Alsayyed Ahmad | B60R 25/24 |
| 2018/0037294 A1* | 2/2018 | Kurotobi | B62K 25/04 |
| 2019/0236384 A1* | 8/2019 | Takahashi | A42B 3/0466 |

FOREIGN PATENT DOCUMENTS

| | | |
|---|---|---|
| CN | 211608337 U | 10/2020 |
| WO | WO 2020/115453 A2 | 6/2020 |

OTHER PUBLICATIONS

PCT International Search Report and Written Opinion, PCT Application No. PCT/US21/21560, May 25, 2021, 18 pages.

* cited by examiner

*Primary Examiner* — Naomi J Small
(74) *Attorney, Agent, or Firm* — Fenwick & West LLP

(57) ABSTRACT

A helmet safety system comprises a first set of sensors coupled to a helmet, a second set of sensors coupled to a vehicle, and one or more microcontrollers coupled to the first and second sets of sensors. The one or more microcontrollers can receive sensor data from the first and second sets of sensors and determine, based on the sensor data, that a user is using the bicycle but not wearing the helmet. Responsive to determining that the user is using the bicycle without wearing the helmet, the one or more microcontrollers perform remedial actions, such as disabling or limiting a functionality of the bicycle, emitting an alarm or alert, sending a notification to a first device of the user reminding the user to wear the helmet, and sending a notification to a second device indicating that the user is using the bicycle without wearing the helmet.

20 Claims, 10 Drawing Sheets

BICYCLE HELMET WARNING SYSTEM

CROSS REFERENCE TO RELATED APPLICATIONS

This nonprovisional application claims the benefit or, and priority to, Provisional Application No. 62/987,323 entitled "Bicycle Helmet Warning System," which was filed on Mar. 9, 2020, the contents of which is incorporated by reference herein.

BACKGROUND

This disclosure relates generally to a helmet safety system, and more specifically, to a system of sensors coupled to a vehicle and a helmet for detecting whether a user is wearing a helmet while using the vehicle or not.

When moving on a vehicle, users may forget or choose not to wear a helmet. This can be dangerous behavior as the user is more prone to serious head injuries during an accident without a helmet to protect their head. In these cases, a user may benefit from a reminder to wear a helmet to prevent potential injury. Further, people may be concerned about a user's helmet use. For example, a parent may be worried that their child, when biking to school or biking around their neighborhood, is not consistently wearing their helmet. However, these parents have no way to verify that their child has been wearing their helmet without seeing them as they bike.

SUMMARY

A helmet safety system (i.e., "the system," for simplicity) can provide alerts based on data indicating the use of a helmet while a user is operating a vehicle (e.g., bicycle, scooter, skateboard, motorcycle, etc.). In particular, the system includes vehicle sensors attached to a portion of a vehicle (e.g., the top of a bicycle seat, base/foot stand of a skateboard, etc.), helmet sensors attached to a portion of a helmet, and one or more processors connected to the sensors. In some embodiments, the system may also include other sensors attached to the vehicle that gather data that can be used to determine whether the user is using the vehicle and/or sensors attached to the helmet to determine whether the user is wearing the helmet. When the processor determines that a user is using the vehicle, based on data received from the vehicle sensors, and the user is not wearing a helmet, based on data from the helmet sensors, the processor sends an alert. This alert may cause speakers to output a loud continuous noise and/or comprise a message sent to a mobile device indicating that the user is using the vehicle without a helmet.

More particularly, in some embodiments, the system comprises one or more flex sensors coupled to an inside surface of a helmet, one or more load sensors coupled to a bicycle seat, a processor communicatively coupled to the one or more flex sensors and one or more load sensors, and a non-transitory computer-readable medium comprising instructions executable by the processor. The processor, upon executing the instructions, can receive flex sensor data from the one or more flex sensors and load sensor data from the one or more load sensors. The processor compares the load sensor data to a first threshold value. Responsive to determining that the load sensor data exceeds the first threshold value, the processor compares the flex sensor data to a second threshold value, and responsive to determining that the flex sensor data exceeds the second threshold value, the processor sends an alert. In some embodiments, the processor sends the alert by instructing a speaker to output a loud continuous or repetitive noise. In other embodiments, the processor sends the alert by sending a notification to a mobile device indicating that a user of the bicycle is not wearing the helmet.

In other embodiments, the system comprises a first set of sensors coupled to a helmet, a second set of sensors coupled to a vehicle seat or other portion of the vehicle, a processor communicatively coupled to the first set of sensors and the second set of sensors, and a non-transitory computer-readable storage medium comprising instructions executable by the processor. The processor, upon executing the instructions, can receive sensor data captured by the first and second sets of sensors and determine, based on the received sensor data, that a user is using the bicycle but not wearing the helmet. In response to determining that the user is not using the bicycle, the processor may store data indicating that the bicycle is not in use. In response to determining that the user is using the bicycle without wearing the helmet, the processor performs one or more remedial actions including but not limited to: disabling or limiting a functionality of the vehicle, emitting audio or visual alarm or alert, sending a notification to a first device of the user reminding the user to wear the helmet, and sending a notification to a second device of a second user indicating that the user is using the bicycle without wearing the helmet. The processor may further log whether the user was wearing the helmet and the one or more remedial actions taken if not.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF FIGURES

The figures filed herewith illustrate the helmet safety system. The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

A helmet safety system (or simply "system") sends alerts to indicate the use of a helmet while a user is on a vehicle. The helmet safety system aims to remind users to wear helmets (or other safety equipment) when using a vehicle that requires a helmet. This may allow users to maintain safe biking practices and provide other users (such as parents or guardians) with information indicating whether a user is applying safety equipment when using the vehicle.

System Environment

Figure 1:
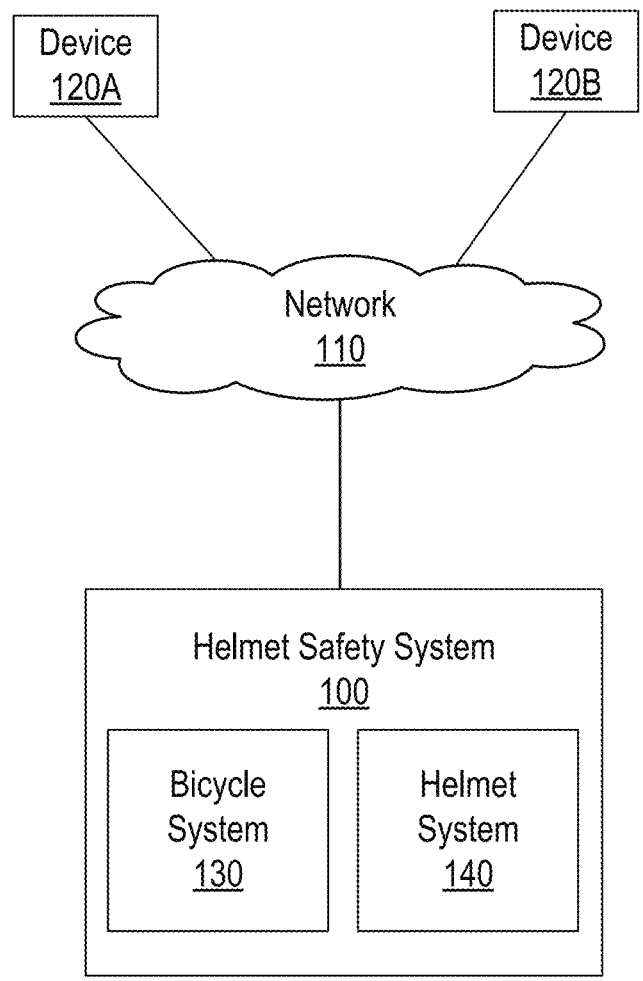
FIG. 1 illustrates an environment of a helmet safety system, according to one embodiment.

FIG. 1 illustrates an environment of a helmet safety system 100, according to one embodiment. The helmet safety system 100 is connected to a number of client devices 120 that may receive data captured by the helmet safety system 100. These various components are now described in additional detail.

The devices 120 (or client devices) are computing devices such as smart phones, laptop computers, desktop computers, or any other device that can communicate with the helmet safety system 100 via the network 110. The devices 120 may provide a number of applications, which may require user authentication before a user can use the applications, and the devices 120 may interact with the helmet safety system 100 via an application. Though two devices 120 are shown in FIG. 1, any number of devices 120 may be connected to the helmet safety system 100 in other embodiments.

The network 110 connects the devices 120 to the helmet safety system 100. The network 110 may be any suitable communications network for data transmission. In an embodiment such as that illustrated in FIG. 1, the network 110 uses standard communications technologies and/or protocols and can include the Internet. In another embodiment, the network 110 uses custom and/or dedicated data communications technologies.

The helmet safety system 100 includes a bicycle system 130, which is attached to a bicycle. Though the following description is described in relation to a bicycle, in some embodiments, the bicycle may alternatively be a skateboard, scooter, motorcycle, hoverboard, surfboard, skis, snowboard, race car, horse, boat, or another mode of transportation that may require safety equipment such as a helmet (e.g., the saddle of a horse). The bicycle system 130 comprises a plurality of sensors (henceforth referred to as bicycle sensors) able to capture sensor data on the bicycle. The bicycle sensors may include, in various embodiments, one or more of: load sensors, a Global Positioning System (GPS), acceleration sensors (e.g., accelerometers), speed sensors, heat sensors, stress sensors, strain sensors, flex sensors, rotation or motion sensors, flex sensors, pressure sensors (e.g., piezoelectric sensors, capacitive sensors, and piezoresistive strain gauge sensors), circuit boards, Bluetooth transceivers, microcontrollers (such as Arduinos or other processors).

In embodiments where the bicycle sensors include load sensors, load sensors are attached to a bicycle seat of the bicycle and, in some embodiments, are configured between two pieces of wood to stay in place and reduce erroneous data output. On other vehicles, the load sensors may be coupled to a seat, base, foot stand, or other portion of the vehicle where the user stands, sits, or otherwise touches or applies weight. Further, the load sensors may be covered with a piece of felt or other cloth/cushioning material for the comfort of a user of the bicycle. The load sensors are connected to a first microcontroller, a first circuit board, and first Bluetooth transceiver is attached to the back of the bicycle. In some embodiments, the load sensors are directly connected to the first microcontroller, a first circuit board, and first Bluetooth transceiver via one or more wires.

Other bicycle sensors may be attached to various portions of the bicycle (or other vehicle). For example, an acceleration sensor, speed sensor, and/or GPS may be coupled to a bicycle frame or bicycle handlebars of the bicycle to capture sensor data as the bicycle moves (or does not move). Heat, strain, stress, load, flex, or pressure sensors may be applied to the bicycle seat, bicycle wheels, or bicycle handlebars (or board, base, steering wheel, saddle, etc. of another type of vehicle) to capture data when a user sits/stands on the bicycle or grasps the bicycle handlebars. Motion or rotation sensors may be coupled to the bicycle wheels to capture data as the wheels rotate or pivot or gears turn. These bicycle sensors may be coupled to the first microcontroller, first circuit board, and first Bluetooth transceiver or to another microcontroller, circuit board, and Bluetooth transceiver coupled to the bicycle seat or the bicycle handlebars. In some embodiments, the bicycle system may further include a speaker, buzzer, beeper, camera, or light-emitting diode coupled to the bicycle and the first microcontroller, first circuit board, and first Bluetooth transceiver.

The helmet safety system 100 also includes a helmet system 140 attached to a helmet. The helmet may be a protective covering for a head of a user, and in some embodiments may include or alternatively be other safety equipment such as knee pads, elbow pads, shin guards, goggles, life vests, and the like. The helmet system 140 comprises a plurality of sensors (henceforth referred to as helmet sensors) able to capture sensor data on the helmet. The helmet sensors may include, in various embodiments, one or more of: flex sensors, GPS, acceleration sensors, heat sensors, stress sensors, strain sensors, motion sensors, rotation sensors, load sensors, load sensors, pressure sensors (e.g., piezoelectric sensors, capacitive sensors, and piezoresistive strain gauge sensors), circuit boards, Bluetooth transceivers, microcontrollers (such as Arduinos or other processors).

In embodiments where the helmet sensors include flex sensors, the flex sensors are attached to an inside surface of the helmet such that the flex sensors are bent when a user is wearing the helmet and not bent when a user is not wearing the helmet. The flex sensors are connected to a second microcontroller, a second circuit board, and second Bluetooth transceiver, which are attached to the top of the helmet. In some embodiments, the flex sensors are directly connected to the second microcontroller, a second circuit board, and second Bluetooth transceiver via one or more wires.

In some embodiments, other helmet sensors may be coupled to the helmet. For example, an acceleration sensor, speed sensor, or GPS may be coupled to the inside surface, outside surface, or inside (e.g., between the inside surface and outside surface) of the helmet to capture sensor data as the helmet moves. Rotation or motion sensors may also be coupled to the helmet to capture data that can be used to determine apposition of the helmet (e.g., the inside surface facing upwards or downwards). Heat, strain, stress, load, or pressure sensors may be applied to the inside surface of the helmet or straps of the helmet to determine if a user is wearing the helmet (e.g., the helmet is on the user's head or straps are properly secured). These helmet sensors may be coupled to the second microcontroller, second circuit board, and second Bluetooth transceiver or communicatively coupled to the first microcontroller, first circuit board, and first Bluetooth transceiver coupled to the bicycle seat or the bicycle handlebars. In some embodiments, the helmet system 140 may further include a speaker, buzzer, beeper, camera, or light-emitting diode coupled to the helmet and the second microcontroller, second circuit board, and second Bluetooth transceiver.

The bicycle system 130 and helmet system 140 can communicate with one another and one or more devices 120 via the Bluetooth transceivers to send data and take remedial actions. If the helmet system 140 and the bicycle system 130 are out of a Bluetooth range of the Bluetooth transceivers from one another, the helmet system 140 and bicycle system 130 may automatically reconnect with one another once the bicycle and helmet move back within Bluetooth range. In some embodiments, the helmet system 140 may automatically turn off if not in the Bluetooth range of the bicycle system 130. In some embodiments, the bicycle system 130 and helmet system 140 may collect sensor data captured by the bicycle and helmet sensors even if the helmet system 140 and bicycle system 130 are out of Bluetooth range of one another. Once the helmet system 140 and bicycle system 130 are within Bluetooth range again, the helmet system 140 may send sensor data captured by the helmet sensors when the helmet system 140 and bicycle system 130 were out of Bluetooth range. The bicycle system 130 may determine whether a user was not wearing the helmet while operating the bicycle based on the sensor data and take one or more remedial actions, as described below.

In some embodiments, a user may activate the helmet system 140 using a switch connected on the helmet system 140. Upon activation of the helmet system 140, the helmet system 140 may capture sensor data from the helmet sensors as a baseline reading, which indicates values of the sensor data when the helmet is not being worn. For example, when the helmet is not being worn the flex sensors may be unbent. In some embodiments, the helmet system 140 may additionally capture sensor data when the helmet sensors are in multiple configurations (e.g., bent/unbent, activated, rotated, etc.) to determine a threshold value for each helmet sensor. Each threshold value indicates a cutoff point in the sensor data for determining whether or not a user is wearing the helmet using the associated helmet sensor. In some embodiments, the helmet system 140 determines new threshold values of the helmet sensors every time the helmet system 140 is activated, and in other embodiments, the helmet system 140 uses the same threshold values determined after an initial activation. Further, in some embodiments, the helmet system may determine multiple threshold values for different configurations of the helmet sensors.

The helmet system 140 captures sensor data from one or more other helmet sensors after activation to determine if the user is wearing the helmet. For instance, the helmet system 140 may compare the sensor data from each helmet sensor to an associated threshold value to determine if the user is wearing the helmet. In one example, the helmet system 140 may capture acceleration data from an acceleration sensor on the helmet and use the acceleration data to determine if the helmet is turned so the inside surface is facing up, indicating that the user is not wearing the helmet, or turned so that the inside surface is facing the ground, indicating that the user may be wearing the helmet. The helmet system 140 may determine that the user is not wearing the helmet if the sensor data associated with one or a threshold number of the helmet sensors indicate that the user is not wearing the helmet.

The helmet system 140 may communicate sensor data relative to threshold values to the bicycle system. For example, in some embodiments, if the sensor data for one or more of the helmet sensors exceeds its associated threshold value, the helmet system 140 sends an indication to the bicycle system 130 indicating that the user is wearing the helmet. In some embodiments, the helmet system 140 may still send an indication that the user is wearing the helmet if the sensor data for one or more of the helmet sensors is less than its associated threshold value. For instance, sensor data captured from one or more flex sensors may indicate that the helmet is being worn if the data is below (e.g., bent in one direction) or above (e.g., bent in another other direction) the associated threshold. In these embodiments, the associated threshold may be associated with a range of error, such that the helmet system 140 compares the sensor data to the range of error around the threshold and sends the indication if the sensor data is outside of the range.

In another embodiment, the helmet system 140 may communicate raw sensor data from the helmet sensors to the bicycle system 130, which determines, based on the sensor data, whether the user is wearing the helmet. The helmet system 140 may periodically check the sensor data to determine a status of the helmet (i.e., being worn or not) and communicate to the bicycle system 130 if the status has changed from its previous status. For example, the helmet system 140 may transmit acceleration data captured by the helmet system 140 (referred to as helmet acceleration data) to the bicycle system 130 such that the bicycle system 130 can compare the helmet acceleration data to acceleration data captured at the bicycle system 130 (referred to as bicycle acceleration data). In another example, the helmet system 130 may captured pressure data from pressure sensors on the straps of the helmet and if the pressure data indicates that the user's face is not in contact with the straps or the straps are not connected together, the helmet system 140 may send an indication to the bicycle system 130 that the user's safety is compromised. The helmet system 140 may send sensor data captured by a plurality of the helmet sensors such that the bicycle system 130 may use the sensor data in conjunction to determine if the user is wearing the helmet.

The bicycle system 130 receives sensor data from the bicycle sensors. In some embodiments, a user may activate the bicycle system 130 using a switch connected to the bicycle system 130, and the bicycle system 130 may capture sensor data, upon activation, indicating a baseline reading of the bicycle sensors without a user operating the bicycle. The bicycle system 130 may use this baseline reading to determine a threshold value for sensor data from each bicycle sensor, indicating if the user is currently operating on the bicycle or not. For example, if sensor data from load sensors exceeds the threshold value, the bicycle system may determine that the user is sitting/standing on the bicycle 130. In some embodiments, the bicycle system 130 may still determine that the user is operating the bicycle if the sensor data for one or more of the bicycle sensors is outside of a range around a threshold value. In further embodiments, the bicycle system 130 determines new threshold values for each bicycle sensor every time the bicycle system 130 is activated, and in other embodiments, the bicycle system 130 uses the same threshold values determined after an initial activation.

The bicycle system 130 may captures sensor data from one or more of the bicycle sensors to determine if a user is using the bicycle. For instance, the bicycle system 130 may capture acceleration data from an acceleration sensor on the bicycle and use the acceleration data to determine if the bicycle is moving (e.g., a user is using the bicycle) with the same acceleration as the helmet. In another instance, the bicycle system 130 may capture sensor data from one of more bicycle sensors (e.g., heat sensors, pressure sensors, etc.) coupled to the bicycle seat or bicycle handlebars to determine if the user is sitting on the bicycle or gripping the bicycle handlebars. The bicycle system 130 may determine that a user is operating the bicycle if sensor data from one or a threshold number of the bicycle sensors indicate that the user is operating the bicycle. For example, even if acceleration data indicates that the bicycle is not moving, the bicycle system 130 may determine that the user is operating the bicycle if load sensor data captured by load sensors on the bicycle seat indicate that the user is sitting on the bicycle.

When the bicycle system 130 detects that a user is operating the bicycle (e.g., sitting on the bicycle, gripping the bicycle handlebars, pedaling, etc.), based on the sensor data captured by the bicycle sensors, the bicycle system 130 may request an indication of the status of the helmet from the helmet system 140. In other embodiments, the bicycle system 130 may request raw sensor data from the helmet system 140 and use the raw sensor data to determine the status of the helmet. If the bicycle system 130 determines that the user is not wearing the helmet while operating the bicycle or receives an indication from the helmet system 140 that the user's safety is comprised, the bicycle system 130 may take remedial action. Otherwise, the bicycle system 130 may continue to monitor the status of the helmet if the user is still using the bicycle. In some embodiments, the bicycle system 130 may automatically deactivate upon determining that the user is no longer on the bicycle.

The bicycle system 130 may take one or more remedial actions in response to determining that the user is using the bicycle without a helmet. Remedial actions may include disabling or limiting functionality of the bicycle, such as automatically locking the pedals or gears on the bicycle, activating the brakes of the bicycle, limiting a maximum speed of the bicycle, emitting an audio or visual alarm or alert on the bicycle or helmet, or capturing image data of the area around the bicycle or helmet. Examples of alarms and alerts include a loud continuous or repetitive noise emitted from a speaker coupled to bicycle, flashing a light-emitting diode coupled to the bicycle, or activating a vibrating motor disc coupled to the bicycle. In some embodiments, the bicycle system 130 may emit multiple alarms or alerts at once or may emit a custom alarm selected via an application running on a device 120 connected to the helmet safety system 100.

Other remedial actions may include wirelessly sending one or more notifications to one or more devices 120 indicating that the user is using the bicycle without the helmet. For example, in one embodiment, the bicycle system 130 may send a notification to a device 120 associated with the user reminding the user to wear the helmet or indicating to properly secure the straps of the helmet. The bicycle system 130 may additionally send such notifications upon determining that a device 120 of the user is located within a threshold distance of the bicycle based on GPS data captured by the bicycle system 130 and the device 120, which may indicate that the user is about to use the bicycle. In another embodiment, the bicycle system 130 may send a notification to a device 120 of a second user indicating that the user is not wearing their helmet while using the bicycle. For example, if a child is biking without their helmet, the bicycle system 130 may send a notification to devices 120 of the child's parents or guardians indicating that the child is not wearing their helmet. In other embodiments, the bicycle system 130 may also send notifications indicating that the user is using the bicycle along with the helmet as positive reinforcement for safe biking practices. Further, in some embodiments, the user (or a second user, such as a parent) may configure the bicycle system to take one or more of the remedial actions via an application at a device 120 responsive to determining that the user is not wearing the helmet while operating the bicycle.

The bicycle system 130 may store the sensor data captured by the bicycle system 130 and helmet system 130. The bicycle system 130 may further compile the stored sensor data into a log representing the user's use of the bicycle and helmet and where the user traveled using the bicycle over time. For example, the log may indicate that the user was wearing their helmet while traveling on the bicycle on Lido Street at 8:00 AM on Wednesday, April 17 and be associated with an image captured by a camera of the helmet safety system 100. The bicycle system 130 may receive requests from one or more devices 120 to see a current status of the bicycle (e.g., moving while the user is wearing a helmet, not moving while the user is not wearing the helmet, etc.), and in some embodiments, the bicycle system 130 may continuously send the log in real-time to one or more devices 120 such that users of the devices 120 can view the log of sensor data.

Embodiments of the entities described herein can include other and/or different systems than the ones described here. In addition, the functionality attributed to the systems can be performed by other or different systems in other embodiments. Moreover, this description occasionally omits the term "system" for purposes of clarity and convenience.

Figure 2A:
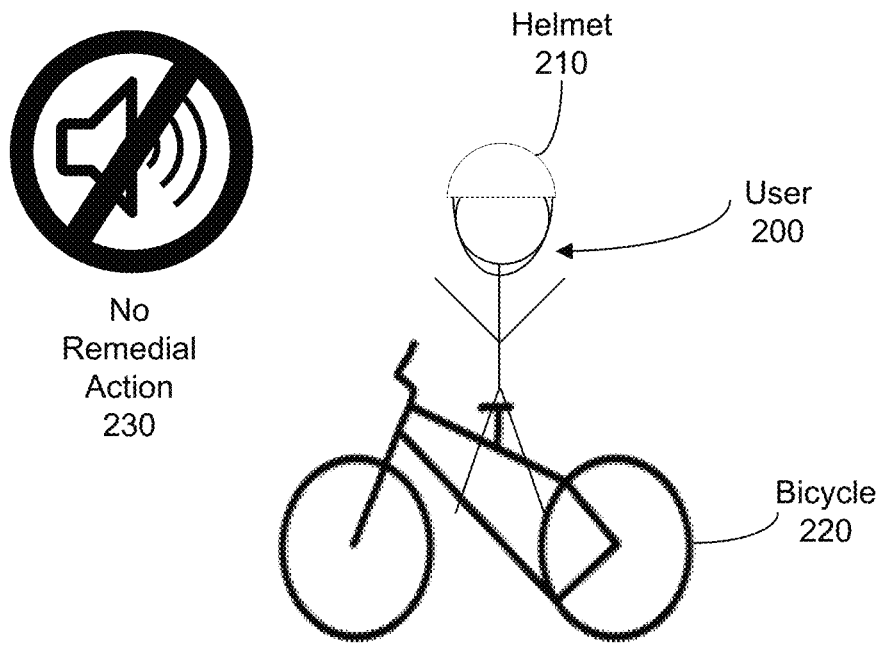
FIG. 2A illustrates a user wearing a helmet on a bicycle, according to one embodiment.
Figure 2B:
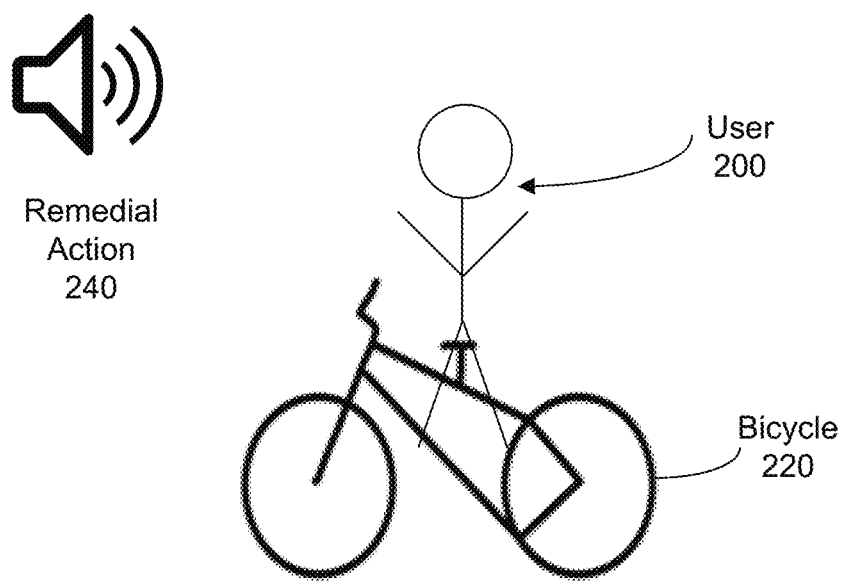
FIG. 2B illustrates a user not wearing a helmet on a bicycle, according to one embodiment.
Figure 2C:
FIG. 2C illustrates a user wearing a helmet while not operating a bicycle, according to one embodiment.
Figure 2C:
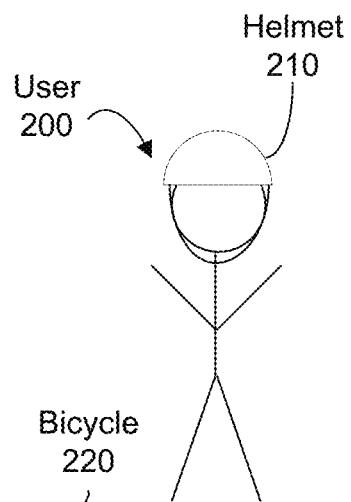
Figure 2C:
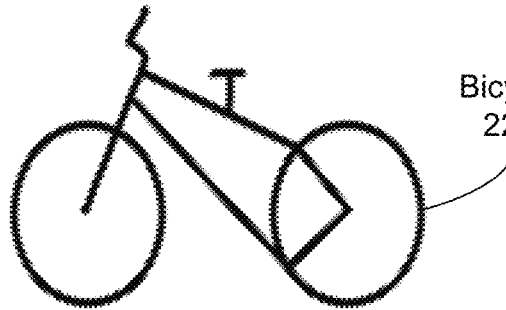
Figure 2D:
FIG. 2D illustrates a user not wearing a helmet while not operating a bicycle, according to one embodiment.
Figure 2D:
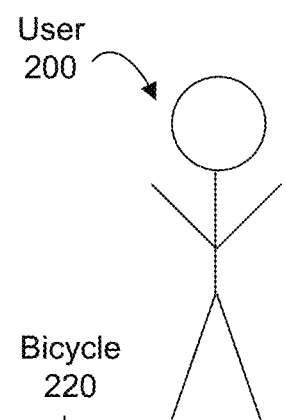
Figure 2D:
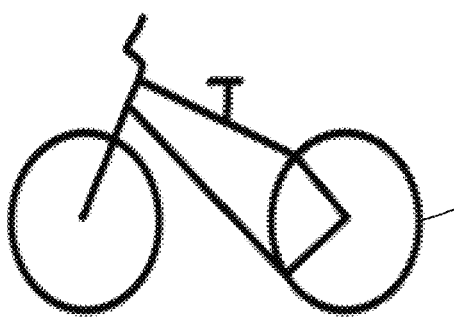

FIGS. 2A-2D illustrate instances when the bicycle system 130 takes remedial action or not. For example, in FIG. 2A, a user 200 is wearing a helmet 210 on a bicycle 220, so the bicycle system 130 does not take a remedial action 230. In the example shown in FIG. 2B, when the user 200 is not wearing a helmet 210 while on the bicycle 220, the bicycle system 130 may perform a remedial action, such as sounding an alarm or notifying a device 120 associated with the user 200. Further, if the user 200 is wearing the helmet 210 (as shown in FIG. 2C) or not wearing the helmet 210 (as shown in FIG. 2D) while not on the bicycle 220, the bicycle system 130 does not take a remedial action 230. Though FIGS. 2A-2D depict a bicycle and helmet being used in conjunction with the bicycle system 130, in some embodiments, the bicycle system 130 may be used in conjunction with a skateboard, scooter, horse, or other vehicle instead of a bicycle 220 and/or knee pads, elbow pads, goggles, padding, or other safety equipment instead of the helmet 210.

Figure 3:
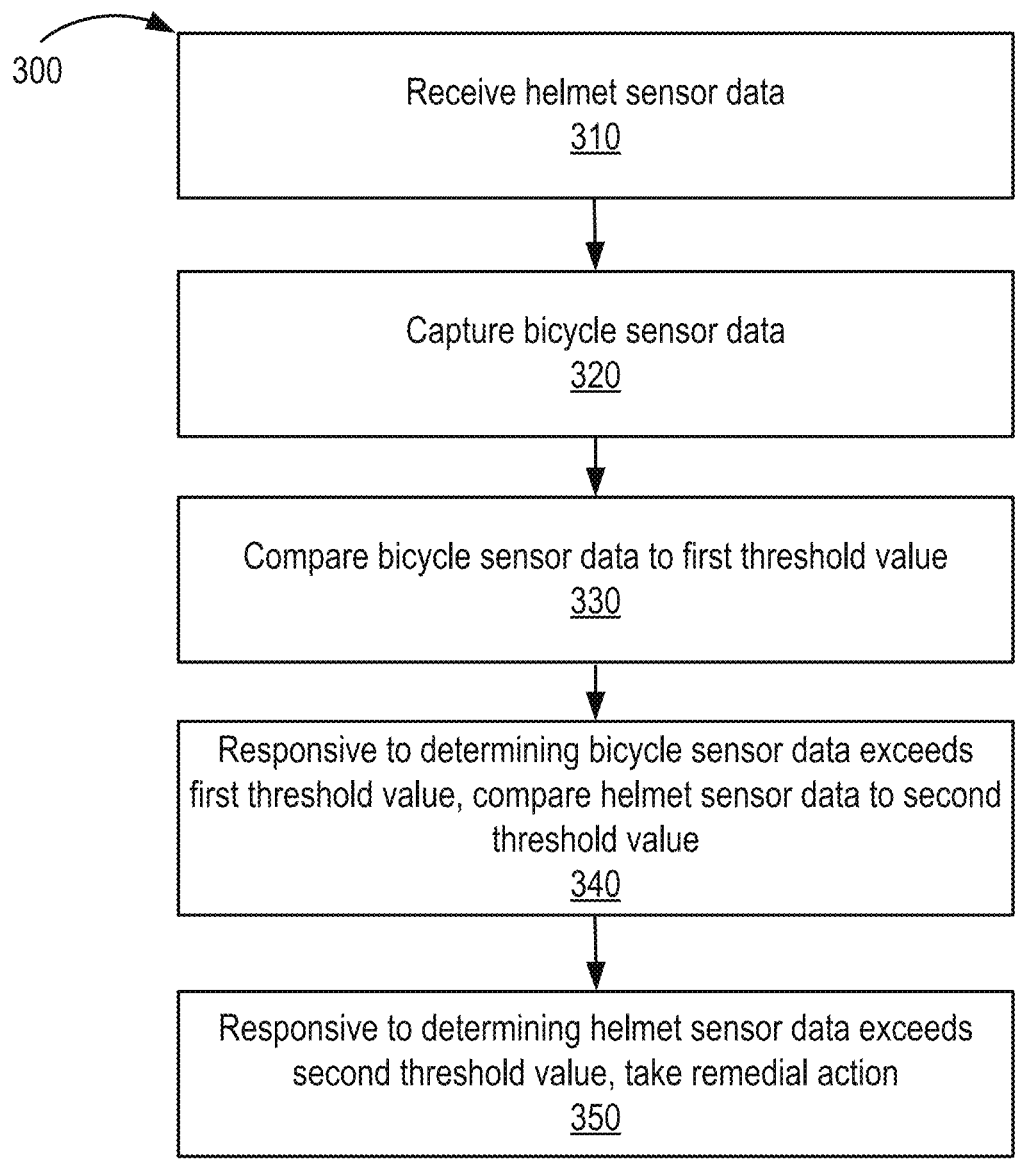
FIG. 3 is a flowchart illustrating a process for sending an alert via a helmet safety system, according to one embodiment.

FIG. 3 is a flowchart illustrating a process 300 for taking a remedial action via a helmet safety system 100, according to one embodiment. In particular, the bicycle system 130 of the helmet safety system 100 receives 310 helmet sensor data captured by helmet sensors at the helmet system 140. The helmet sensor data may include one or more of flex sensor data, pressure sensor data, acceleration data, and heat sensor data captured by one or more helmet sensors coupled to a helmet 210. The bicycle system 130 captures 320 bicycle sensor data via one or more bicycle sensors coupled to a bicycle 220. The bicycle sensor data may include one or more of load sensor data, heat sensor data, pressure sensor data, acceleration data, stress data, and strain data. The bicycle system 130 compares 330 the bicycle sensor data to a first threshold value and responsive to determining that the bicycle sensor data exceeds the first threshold value, the bicycle system 130 compares 340 the helmet sensor data to a second threshold value. Responsive to determining that the helmet sensor data exceeds the second threshold value, the bicycle system 130 takes 350 a remedial action, such as disabling or limiting a functionality of the bicycle 220, emitting an alarm or alert, sending a notification to a first device of a user 200 reminding the user 200 to wear the helmet 210, and sending a notification to a second device of a second user indicating that the user 200 is using the bicycle 220 without wearing the helmet 210.

It is appreciated that although FIG. 3 illustrates a number of interactions according to one embodiment, the precise interactions and/or order of interactions may vary in different embodiments. For example, in some embodiments, the helmet system 140 may compare the bicycle sensor data and helmet sensor data to the first and second threshold value. Alternatively, the bicycle system 130 may use the bicycle sensor data and helmet sensor data to determine if the user 200 is using the bicycle 220 and wearing the helmet 210 by comparing the bicycle sensor data and helmet sensor data to the first and second threshold values simultaneously. The bicycle system 130 may store the bicycle sensor data and helmet sensor data along with a current time in a log of the bicycle's use responsive to determining that the user 200 is not using the bicycle 220 while wearing the helmet 210, is not using the bicycle 220 while not wearing the helmet 210, or is using the bicycle 220 while wearing the helmet 210.

FIGS. 4-9 illustrate configurations of the helmet safety system 100 on a bicycle 220. Though a bicycle 220 is shown in FIGS. 4-9, in some embodiments, the helmet safety system 100 may be coupled to another vehicle. Furthermore, the helmet safety system 100 may use additional or alternative sensors to those shown in some embodiments.

Figure 4:
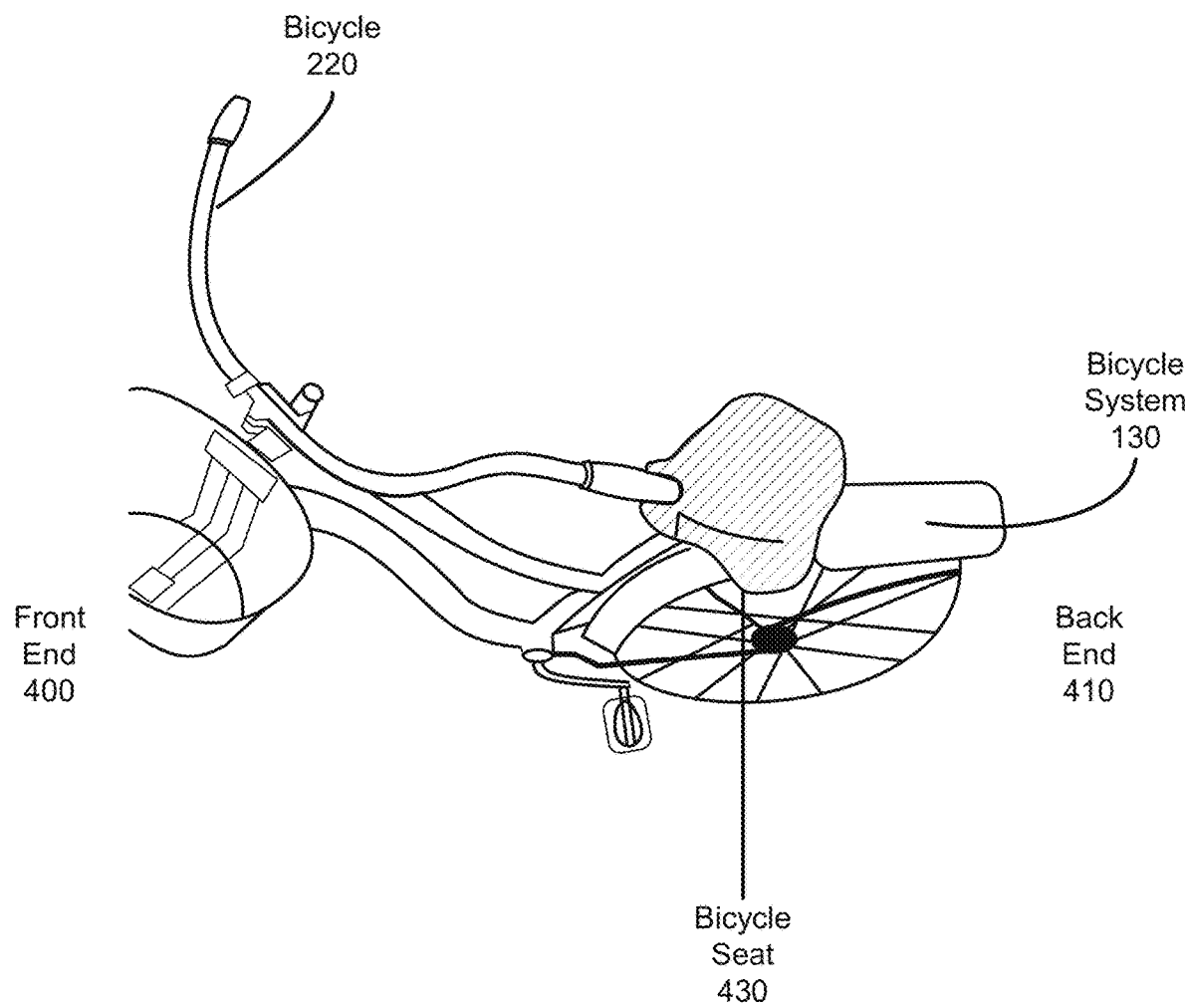
FIG. 4 illustrates a bicycle system of the helmet safety system on a bicycle, according to one embodiment.
Figure 5:
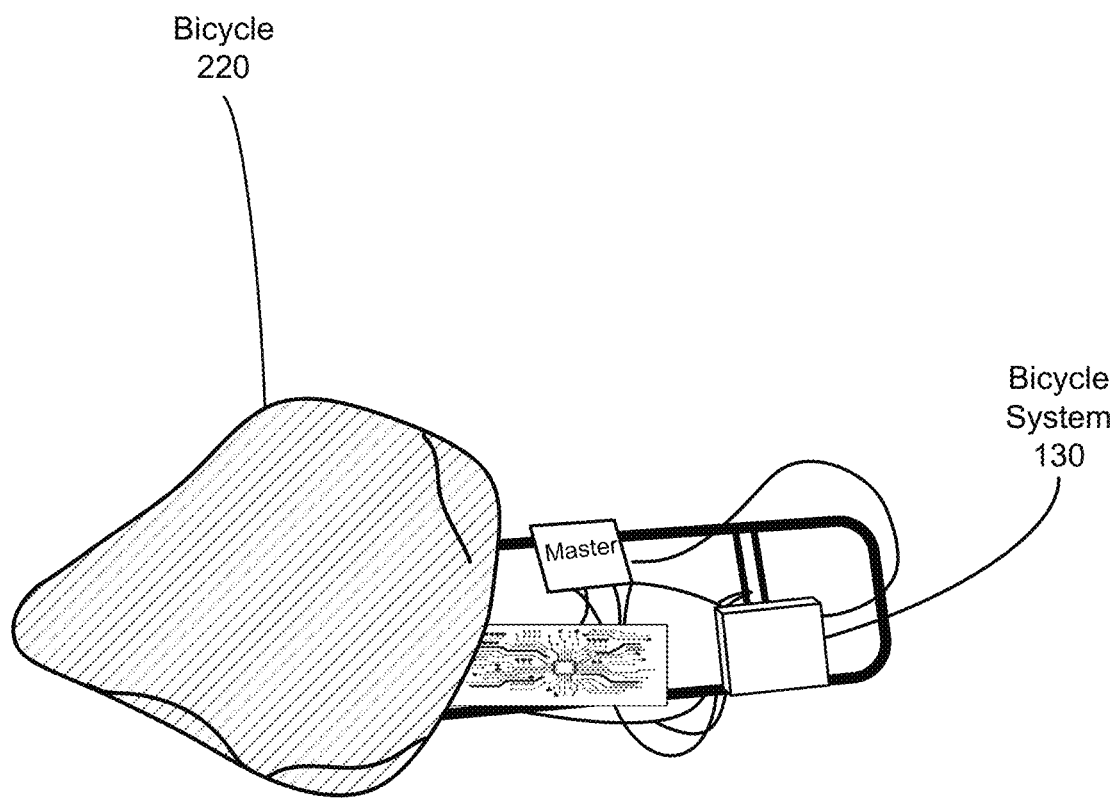
FIG. 5 illustrates a close view of a bicycle system of the helmet safety system on a bicycle, according to one embodiment.
Figure 6:
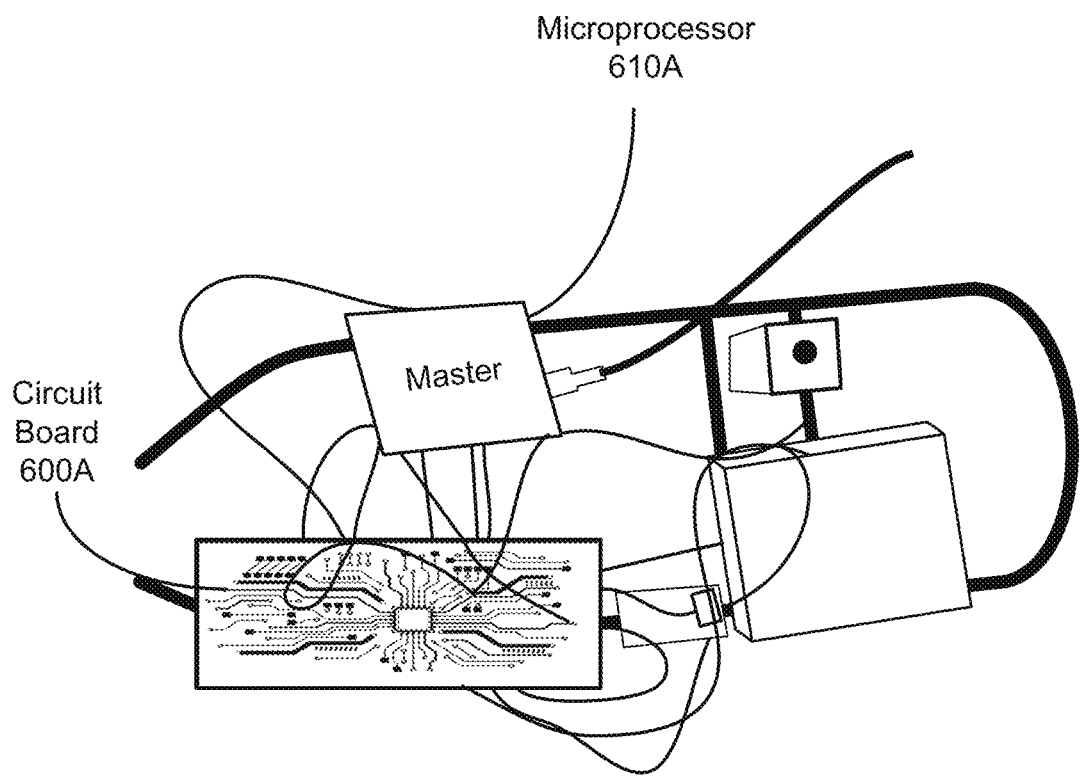
FIG. 6 illustrates a microprocessor and circuit board of a helmet safety system, according to one embodiment.
Figure 7:
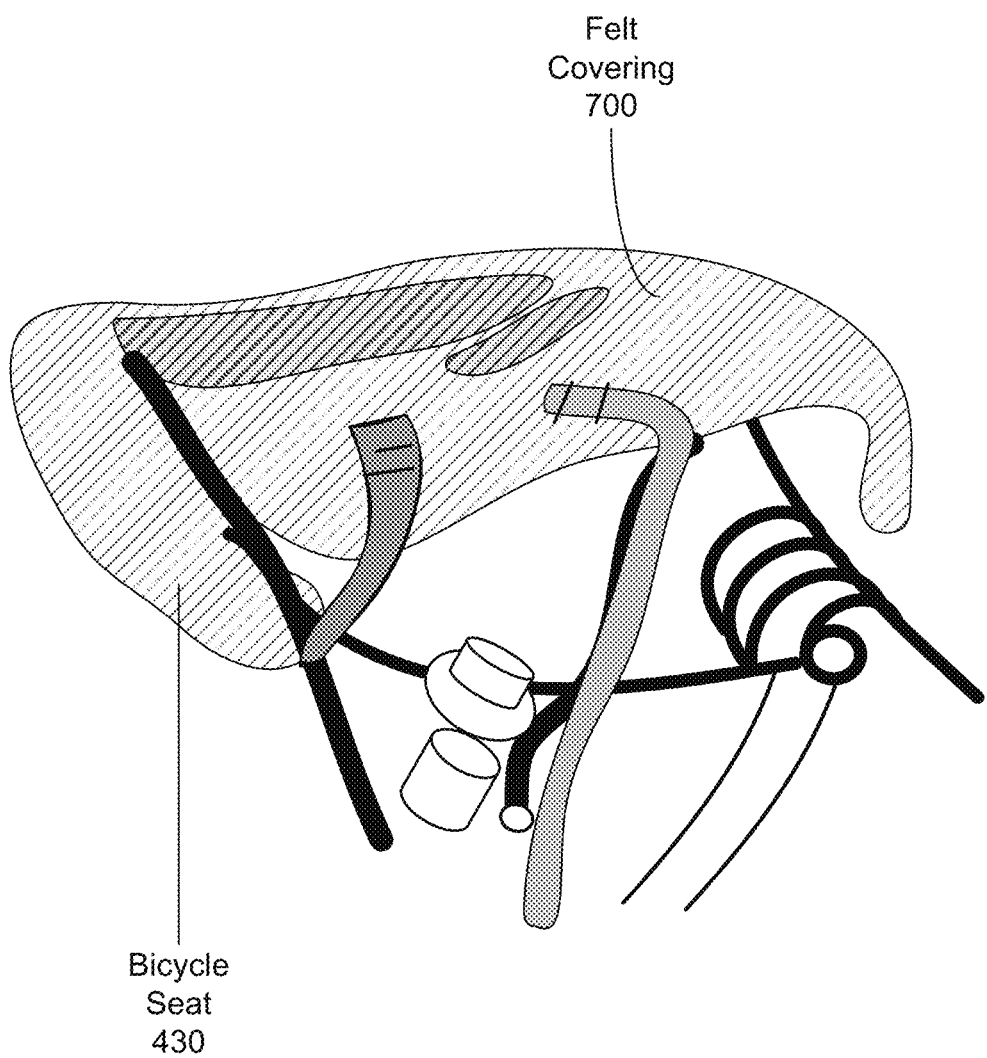
FIG. 7 illustrates a felt covering coupled to a bicycle seat, according to one embodiment.

FIG. 4 illustrates the bicycle system 130 of the helmet safety system 100 on a bicycle, 220 according to one embodiment. The bicycle system 130 may be compact and is coupled to a back end 410 of the bicycle, including the bicycle seat 430 where the load sensors of the bicycle system 130 may be coupled. FIG. 5 further illustrates the bicycle system 130 at the back end 410 of the bicycle 220. In some embodiments, the bicycle system 130 may additionally or alternatively be coupled to the front end 400 of the bicycle 220. The bicycle system 130 may include a microprocessor 610A and circuit board 600A, shown in FIG. 6, coupled to the load sensors or other bicycle sensors. In some embodiments, the load sensors 600 may be covered by a felt covering 700, shown in FIG. 7, at the bicycle seat 430 for comfort of a user 200. The felt covering may be composed of felt in some instances, or may be composed of another material, such as polyester, leather, plastic, three-dimensional printing material, and the like. Further, the helmet safety system 100 may include other felt coverings coupled to the bicycle system 130 or helmet system 140 to partially enclose portions of the helmet safety system 100 for comfort of the user.

Figure 8:
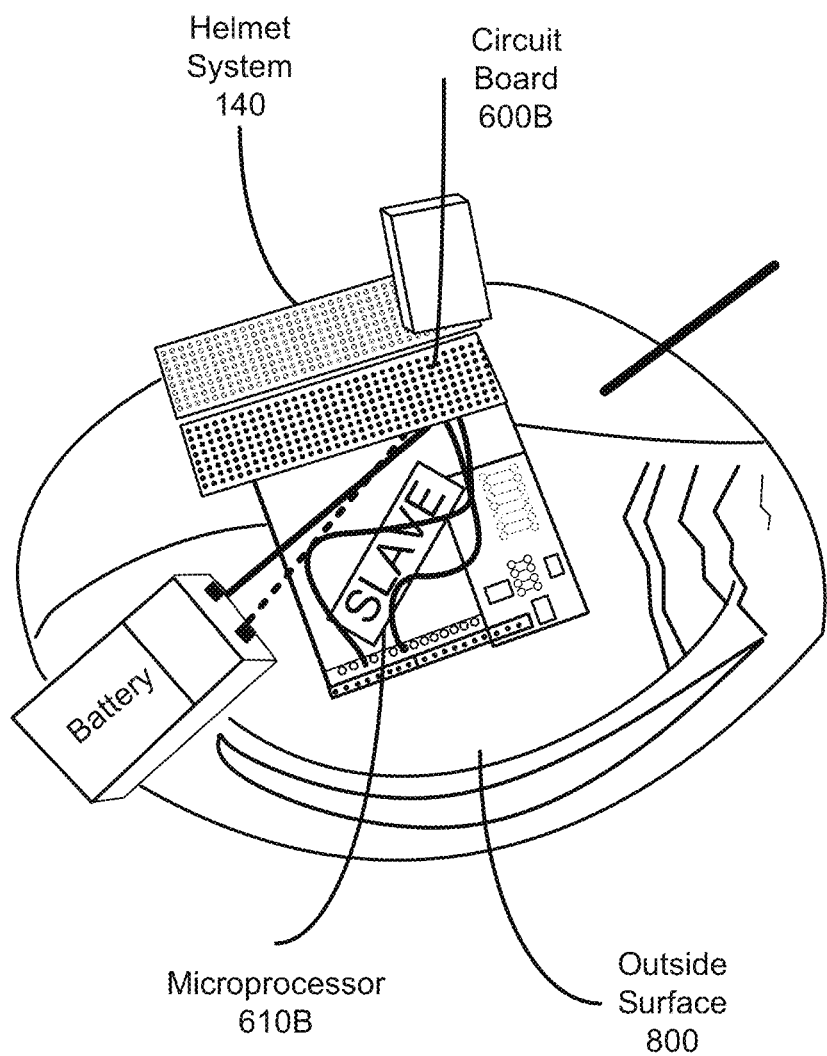
FIG. 8 illustrates a helmet system of the helmet safety system on a helmet, according to one embodiment.
Figure 9:
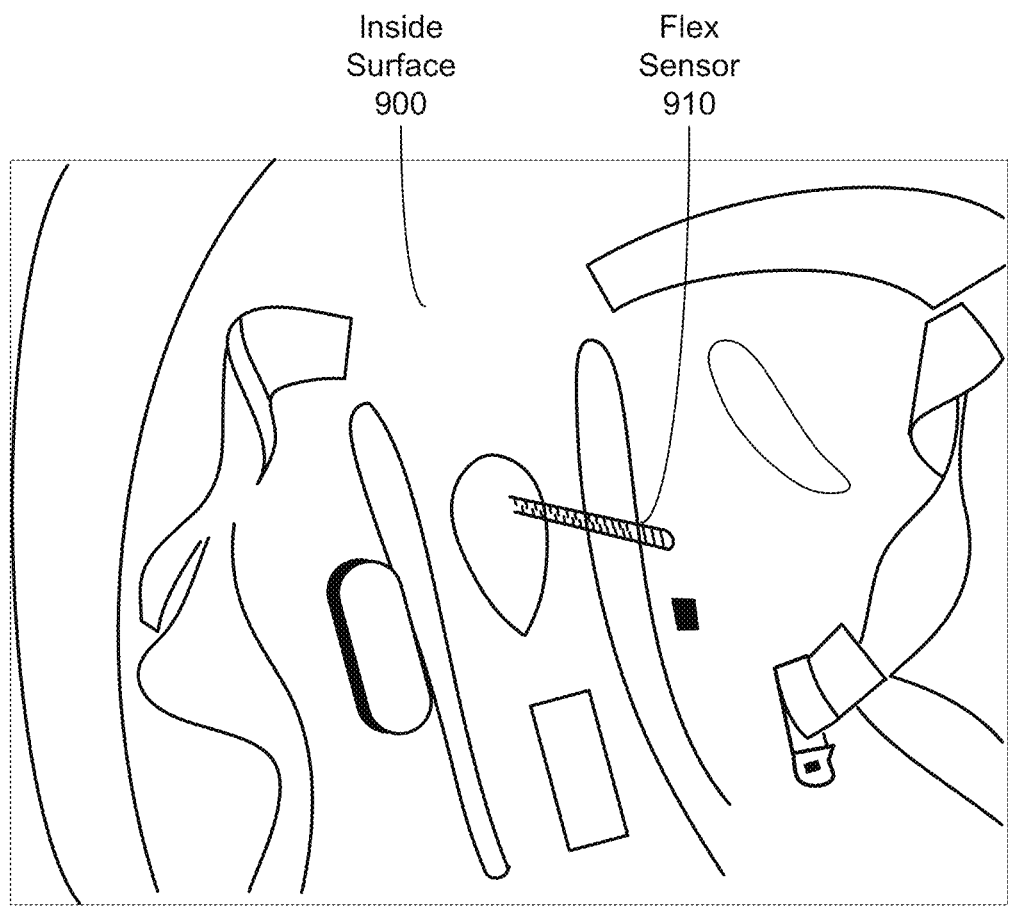
FIG. 9 illustrates a flex sensor coupled to a helmet, according to one embodiment.

The helmet system 140 of the helmet safety system 100 is coupled to a helmet 210. The helmet system 140 may be compact and is coupled to an outside surface 800 of the helmet 210, as shown in FIG. 8, or may be additionally or alternatively coupled to an inside surface of the helmet 210 or an inner portion (e.g., between the outside surface 800 and inside surface) of the helmet 210. The helmet system 140 may include a microprocessor 610B and a circuit board 600B. The helmet system 140 may also include a flex sensor 910 coupled to the inside surface 900 of the helmet 210, such that the flex sensor may bend when a user is wearing the helmet, as shown in FIG. 9. In some embodiments, the helmet system 140 may include additional or alternative helmet sensors coupled to the outside surface 800, inside surface 900, or other portion of the helmet 210.

OTHER CONSIDERATIONS

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMS, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A system for detecting whether a user of a bicycle is wearing a helmet, the system comprising:
   one or more flex sensors coupled to an inside surface of a helmet;
   one or more load sensors coupled to a bicycle seat of a bicycle;
   a processor communicatively coupled to the one or more flex sensors and the one or more load sensors; and
   a non-transitory computer-readable storage medium comprising instructions executable by the processor, the instructions, when executed by the processor, cause the processor to perform steps comprising:
      determining baseline data of the one or more flex sensors and baseline data of the one or more load sensors by activating the one or more flex sensors and the one or more load sensors;
      determining a first threshold value based on the determined baseline data of the one or more load sensors, wherein the first threshold value represents load sensor data of when the user is riding the bicycle;
      determining a second threshold value based on the determined baseline data of the one or more flex sensors, wherein the second threshold value represents helmet sensor data of when the user is wearing the helmet;
      receiving flex sensor data from the one or more flex sensors;
      receiving load sensor data from the one or more load sensors;
      comparing the load sensor data to the first threshold value;
      responsive to determining that the load sensor data exceeds the first threshold value, comparing flex sensor data to the second threshold value; and
      responsive to determining that the flex sensor data exceeds the second threshold value, sending an alert to a device of the user.

2. The system of claim 1, further comprising one or more of: a heat sensor, pressure sensor, a strain sensor, a stress sensor, an accelerometer, a global positioning system, a speed sensor, or a flex sensor coupled to bicycle handlebars or the bicycle seat of the bicycle and communicatively coupled to the processor to capture data that indicates a status of the bicycle.

3. The system of claim 1, further comprising a first accelerometer coupled to the bicycle and a second accelerometer coupled to the helmet.

4. The system of claim 3, wherein the instructions further cause the processor to perform steps comprising:
   receiving a first set of acceleration data from the first accelerometer;
   receiving a second set of acceleration data from the second accelerometer;
   comparing the first set of acceleration data to the second set of acceleration data;
   responsive to determining that the bicycle and helmet are accelerating at rates outside of a threshold level of similarity based on the comparison, sending an alert to the device of the user.

5. The system of claim 1, wherein the instructions further cause the processor to perform steps comprising:
   responsive to determining that the flex sensor data exceeds the second threshold value, sending an alert to a device of a second user, the second user associated with the user.

6. The system of claim 1, further comprising:
   a speaker coupled to the bicycle and communicatively coupled to the processor; and
   wherein the instructions further cause the processor to perform steps comprising:
      responsive to determining that the flex sensor data exceeds the second threshold value, sounding an alarm via the speaker.

7. The system of claim 1, further comprising one or more of: a global positioning system, an accelerometer, a speed sensor, a rotation sensor, a motion sensor, a heat sensor, a pressure sensor, a strain sensor, a stress sensor, or a flex sensor coupled to inside surface, outside surface, inside, or a strap of the helmet and communicatively coupled to the processor.

8. A system for detecting whether a user of a vehicle is wearing a helmet, the system comprising:
   a first set of sensors coupled to an inside surface of a helmet;
   a second set of sensors coupled to the vehicle;
   a processor communicatively coupled to the first set of sensors and the second set of sensors; and
   a non-transitory computer-readable storage medium comprising instructions executable by the processor, the instructions, when executed by the processor, cause the processor to perform steps comprising:
      determining baseline data of the first set of sensors and baseline data of the second set of sensors by activating the first set of sensors and the second set of sensors;
      receiving sensor data from the first set of sensors and the second set of sensors;

comparing the received sensor data from the first set of sensors with the baseline data of the first set of sensors and the received sensor data from the second set of sensors with the baseline data of the second set of sensors;

in response to determining that the user is using the vehicle while wearing the helmet base on the comparsion, storing the sensor data with a current time, a current location, and an indication that the user is practicing safe bicycling; and in response to determining that the user is using the vehicle without wearing the helmet base on the comparsion, performing one or more remedial actions selected from the group: disabling or limiting a functionality of the vehicle, emitting an alarm or alert, sending a notification to a first device of the user reminding the user to wear the helmet, and sending a notification to a second device of a second user indicating that the user is using the vehicle without wearing the helmet.

9. The system of claim 8, wherein the first set of sensors comprises one or more of a flex sensor, a load sensor, a global positioning system, a speed sensor, a rotation sensor, a motion sensor, a pressure sensor, an accelerometer, a heat sensor, a stress sensor, or a strain sensor.

10. The system of claim 8, wherein the second set of sensors comprises one or more of a load sensor, a global positioning system, a speed sensor, a rotation sensor, a motion sensor, a flex sensor, a pressure sensor, an accelerometer, a heat sensor, a stress sensor, or a strain sensor.

11. The system of claim 8, wherein one or more of second set of sensors is coupled to a seat, foot stand, or base of the vehicle.

12. The system of claim 8, wherein the vehicle is a bicycle, skateboard, scooter, motorcycle, hoverboard, surfboard, skis, snowboard, race car, boat, or horse.

13. The system of claim 8, wherein the instructions further cause the processor to perform steps comprising:

in response to determining that the user is not using the vehicle while wearing the helmet, storing the sensor data with a current time, a current location, an image of an area around the vehicle, and an indication that the vehicle is not in use.

14. The system of claim 8, wherein the instructions further cause the processor to perform steps comprising:

in response to determining that the user is not using the vehicle while not wearing the helmet, storing the sensor data with a current time, a current location, an image of an area around the vehicle, and an indication that the vehicle and helmet are not in use.

15. A method for detecting whether a user of a vehicle is wearing a helmet, the method comprising:

determining baseline data of a first set of sensors and baseline data of a second set sensors;

determining a first set of thresholds based on the determined baseline data of the first set of sensors, wherein the first set thresholds represents sensor data of when the user is using the vehicle;

determining a second set of thresholds based on the determined baseline data of the second set of sensors, wherein the second set of thresholds represents sensor data of when the user is wearing the helmet;

receiving sensor data from the first set of sensors coupled to the vehicle and sensor data from the second set of sensors, one or more of the second set of sensors coupled to a helmet;

comparing the received sensor data from the first set of sensors to the first set of thresholds to determine if the user is using the vehicle;

comparing the the sensor data from the second set of sensors to the second set of thresholds to determine if the user is wearing the helmet;

in response to determining that the user is using the vehicle while wearing the helmet, storing the sensor data with a current time and an indication that the user is practicing safe bicycling; and in response to determining that the user is using the vehicle without wearing the helmet, performing one or more remedial actions selected from the group: disabling or limiting a functionality of the vehicle, emitting an alarm or alert, sending a notification to a first device of the user reminding the user to wear the helmet, and sending a notification to a second device of a second user indicating that the user is using the vehicle without wearing the helmet.

16. The method of claim 15, wherein the first set of sensors comprises one or more of a flex sensor, a load sensor, a global positioning system, a speed sensor, a rotation sensor, a motion sensor, a pressure sensor, an accelerometer, a heat sensor, a stress sensor, or a strain sensor.

17. The method of claim 15, wherein the second set of sensors comprises one or more of a load sensor, a flex sensor, a global positioning system, a speed sensor, a rotation sensor, a motion sensor, a pressure sensor, an accelerometer, a heat sensor, a stress sensor, or a strain sensor.

18. The method of claim 15, wherein one or more of the second set of sensors is coupled to a seat, foot stand, or base of the vehicle.

19. The method of claim 15, wherein the vehicle is a bicycle, skateboard, scooter, motorcycle, hoverboard, surfboard, skis, snowboard, race car, boat, or horse.

20. The method of claim 15, wherein one or more of the second set of sensors are coupled to safety equipment, the safety equipment comprising one or more of knee pads, elbow pads, shin guards, goggles, or a life vest.

* * * * *